July 27, 1965

M. MILES 3,197,754

TEMPERATURE INDICATING DEVICE

Filed Dec. 22, 1961

INVENTOR
Marshall Miles

By *William J. Jorsen*
Attorney

Patented July 27, 1965

3,197,754
TEMPERATURE INDICATING DEVICE
Marshall Miles, Wilmette, Ill., assignor to Stewart-Warner Corporation, Chicago, Ill., a corporation of Virginia
Filed Dec. 22, 1961, Ser. No. 161,686
9 Claims. (Cl. 340—213)

This invention relates to temperature indicating devices. More particularly, this invention relates to devices for indicating the attainment of predetermined temperature levels and improved components and circuits therefor.

Present-day temperature indicators, such as those furnished with cooking stoves, or the like, comprise heat sensing elements which cause the energization of alarm devices when a preselected temperature level is sensed. Generally, the heat sensor controls the low voltage current through a bimetal heater coil so that the heat produced thereby at the desired temperature condition deflects the bimetal to close contacts associated therewith and complete a circuit to an alarm device. These circuits usually include a bimetal heating coil connected in series with a thermistor, or other heat sensitive device, across a power source which usually comprises a step-down transformer secondary winding. Thus, the amount of current through the bimetal heating coil is dependent on the temperature of the thermistor. The bimetal operates to close a set of contacts which are in series with an alarm device across the transformer secondary winding. In the circuits of the prior art devices the bimetal including its coil and contacts are usually located within the casing of a temperature gauge in which terminals are provided for connection to the transformer secondary and the alarm. Separate terminals and leads are required for the alarm and the transformer.

The above described type of temperature indicator and its general principles are utilized by a number of manufacturers operating in a highly competitive market. It is, therefore, of utmost concern to reduce the manufacturing and material costs in the fabrication of such devices. It is, therefore, an object of this invention to provide a new and improved device for indicating the attainment of predetermined temperature levels. More particularly it is an object of this invention to provide an electrically operated temperature level indicator and alarm device in which the manufacturing and material costs are greatly reduced due to improvements in the circuits and components thereof.

It is a further object of this invention to provide a temperature indicator and alarm device in which the alarm is naturally intermittent in operation.

It is also an object of this invention to provide a temperature level indicator alarm which forms an integral part of the electrically operated temperature indicator.

Another object of this invention is to provide a novel electrical device which performs the functions of both a transformer and an alarm buzzer.

Further objects and advantages of this invention will be readily understood on a further reading of this specification especially when taken in view of the accompanying drawings, in which.

Briefly, the novel inventive temperature indicating device and alarm comprises a heater element and a heat sensing element for controlling the current through the heater element in electrical connection with the voltage source. Heat responsive means such as a bimetal strip carrying a contact is provided to short circuit the sensor element and the heater element and thus cause an increased current flow through the voltage source. The increased current flow therethrough causes the energization of an alarm device for indicating the attainment of a particular temperature sensed by the heat sensor element.

Figure 1:
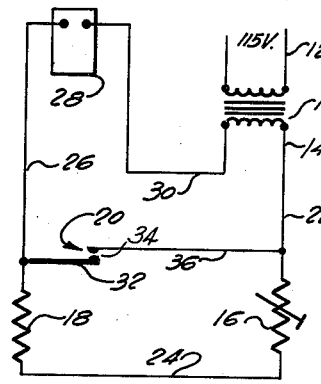
FIG. 1 is a schematic diagram of a circuit including the most basic aspects of this invention.

As shown in FIG. 1, the temperature indicating circuit comprises, in its simplest aspects, a step-down transformer 10 having a primary winding 12 which may be connected to a normal line source, and a secondary 14 which provides the energization for the remainder of the circuit. Series connected across the secondary 14 are a temperature sensing element 16, such as a thermistor, an element 18 which may take the form of a heater coil of a bimetal temperature responsive device 20 and an alarm 28 which may be a lamp or a buzzer. Current will flow from the transformer secondary 14 by way of line 22, thermistor 16, line 24, bimetal heater winding 18, line 26, alarm 28 and line 30 back to the secondary winding 14 to energize the heater coil. The alarm 28 is adjusted so that it will not be energized by the current flowing through this circuit.

The thermistor 16 is a temperature responsive element whose resistance characteristics change in accordance with the ambient temperature in the environment in which it resides. Thus, the temperature to which it is subjected controls the electric current delivered to the bimetal heater 18 through the above described circuit.

A bimetal strip 32 is heatable by the bimetal heater winding 18 to operate a pair of contacts 34 and close a shorting circuit including a line 36 across the series connected thermistor 16 and heater winding 18. This, of course, shunts the current flow from the branch including the thermistor and the heater thus reducing the impedance seen by the secondary winding 14 of the transformer. The increased current will flow through the alarm 28 which, if properly set, will be energized by the increased current flow.

When the shorting circuit is closed, there will no longer be a current through the thermistor element 16 and the heater winding 18, so that heat will no longer be generated thereby. As the bimetal strip 32 cools it will open the contacts 34 and the current flow through the thermistor and heater winding will again be restored. Therefore, the bimetal strip 32 will again deflect to make the contacts 34 and complete the shorting circuit. The periodic operation of the bimetal will cause the intermittent operation of the alarm 28 which will continue until an attendant takes the proper action to deenergize the circuit.

Figure 3:
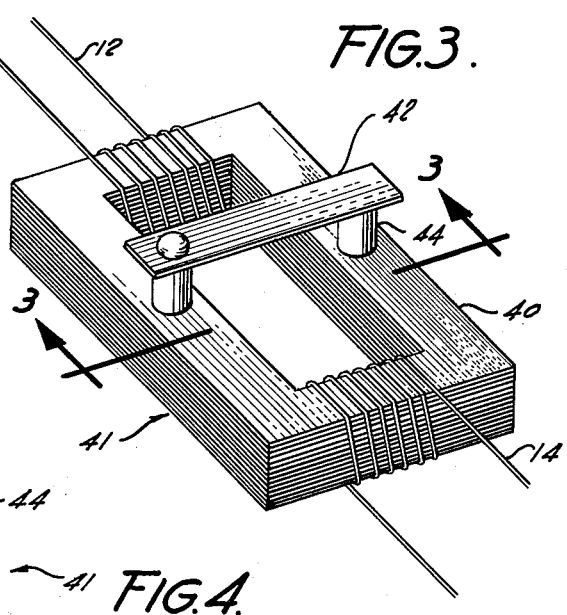
FIG. 3 is an isometric view of a combined transformer and alarm buzzer for use in the circuits of FIGS. 1 and 2.
Figure 4:
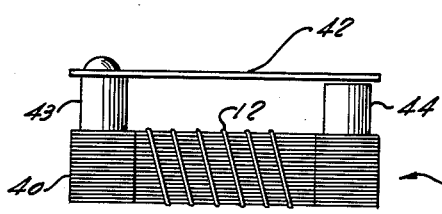
FIG. 4 is a section view of the transformer alarm buzzer taken along the line 4—4 of FIG. 3.

The circuit of FIG. 1 may be further simplified if a special transformer which may serve also as a buzzer alarm (such as the transformer-buzzer 41 shown in FIGS. 3 and 4) is used for the power source of the circuit. The alarm 28 may then be eliminated and the engagement of contacts 34 will complete a direct short circuit across the secondary winding 14 when the temperature level of the environment surrounding the thermistor reaches its desired level.

The special transformer-buzzer 41 comprises a closed-loop, soft-iron laminated permeable core 40 around one portion of which the primary winding 12 is wound and around the opposite portion of which the secondary 14 is wound. The device as so far described operates as a simple transformer and will provide a step down in voltage in accordance with the proper turns ratio between the primary and secondary windings.

A vibratable element 42 mounted in close proximity to the core 40 provides the alarm buzzer action as hereinafter described. The vibratable element 42 is also formed of a highly permeable material and may take the form of a flexible reed such as shown in the drawings which is securely mounted at one end on a post 43 supported by the tranformer core 40. The flexible end of the element 42 is caused to periodically engage a post 44 which as is shown may also be supported by the transformer core 40.

The element 42 is caused to vibrate by leakage magnetic flux emanating from the transformer under certain high current conditions. During normal operating conditions, such as when the thermistor 16 and heater 18 are connected across the secondary 14 and the shorting circuit branch is open, the core 40 of the transformer has sufficient permeability to contain most of the magnetic flux in the loop between the primary 12 and the secondary 14. When the bimetal 32 deflects to engage the contacts 34, however, the secondary 14 of the transformer is effectively short circuited resulting in a very large current flow therethrough. The large alternating current flow causes leakage flux which energizes the vibrating element 42 to oscillate in accordance with the frequency of the alternating current applied to the transformer. The free end of the element 42 hitting against the post 44 causes an audible sound which indicates the shorting of the secondary winding of the transformer.

It has been found that the vibrating element 42 may be positioned anywhere between the primary and secondary windings as long as it is in close proximity to the transformer core 40. The supporting post 43, as well as the post 44 may be made of high permeability material but this is not a necessary requisite to the operation of the device. In fact it has been found that either the support post 43, or the post 44, or both, may be formed of high reluctivity material and the device will still operate in accordance with the teachings of this invention.

Figure 2:
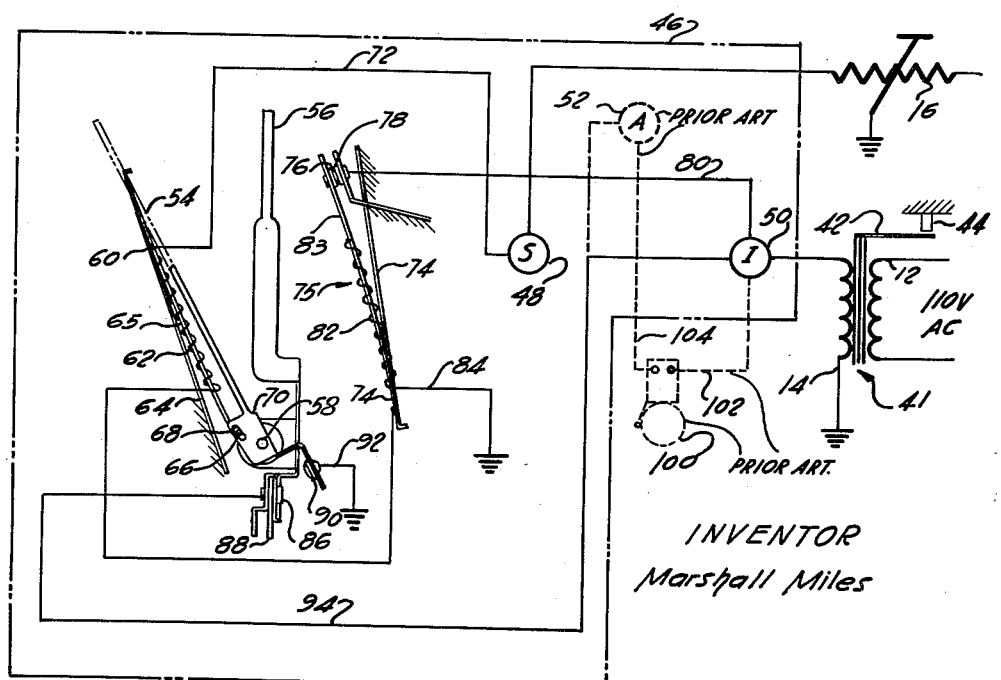
FIG. 2 is a schematic diagram of the inventive circuits of this invention in conjunction with a presettable temperature indicating device and alarm.

Reference is now made to FIG. 2 for a detailed description of a temperature indicator and alarm device which is designed for use in a home cooking stove oven, or the like, and include the special transformer-buzzer hereinbefore described. FIGURE 2 is in partial schematic form and the dash dot line 46 represents a casing which houses all of the components which the line encloses. The casing is adapted for mounting in any convenient location on the stove for viewing and setting by the stove operator. It supports two jacks 48 and 50 which are insulated therefrom and to which are connected external leads from the temperature sensing thermistor 16 and the transformer-buzzer device 41. It is to be understood that jacks 48 and 50 are the only ones required in the device of this invention, and that the jack 52 along with the circuitry attendant thereto shown in phantom pertain to requirements of the prior art as hereinafter described.

A temperature indicating arm 54 and a temperature setting arm 56 are mounted upon a single pivot 58 for separate rotation thereabout. The temperature setting arm 56 is manually translatable for selecting the desired temperature of the stove oven. The indicating arm 54, however, is operable by the electrical circuit components for rotation responsive to the temperature of the oven which is sensed by the thermistor 16.

The indicator arm 54 is translated about its pivot 58 by means of a deflectable bimetal element 60 which is operated responsive to heat generated in its heater winding 62 wrapped therearound. The bimetal 60 is a U-shaped element having one of its legs 64 in rigid support at its end with respect to the casing 46. The other leg 65 of the element 60 has the heater winding 62 wrapped therearound and carries a pin 66 at its extreme end which operationally engages a slot 68 in the pivotally supported end 70 of the indicator arm 54. Thus, as current flows through the winding 62 through a circuit as to be hereinafter described, the heat generated causes the arm which it encircles to deflect concavely to the right as viewed in FIG. 2 so that the pin 66 thereon interacts with the slot 68 on the arm 54 to cause it to rotate in a clockwise direction. The bimetal element 60 is U-shaped to provide variable ambient temperature compensation in a well known manner.

One end of the heater winding 62 is connected by means of lead 72 to jack 48 which also receives the external connection to the thermistor 16 as hereinbefore discussed. The other end of the winding 62 is connected to a second bimetal element 74 which forms a part of a voltage regulator 75 in the circuit for energizing the winding 62. The bimetal 74 carries a contact 76 which is engageable with a positionally fixed contact 78. The contact 78 is connected by means of lead 80 to the jack 50 which also receives the external connection from the secondary 14 of the transformer-buzzer device 41. The indicator arm bimetal heater winding 62 is therefore energizable by the transformer secondary 14 through the circuit including jack 50, line 80, contacts 78 and 76, bimetal element 74, winding 62, line 72, jack 48 and thermistor 16 to ground. The circuit is, therefore, the same as shown in FIG. 1 except for the inclusion of the voltage regulator 75.

The regulator 75 is included for producing a relatively constant mean effective voltage for energizing the indicator arm bimetal winding 62. The bimetal element 74 of the regulator 75 is also U-shaped having the end of one leg 81 rigidly supported with the other leg 83 supporting the contact 76 having a heater winding 82 encircling it. The heater winding 82 has one end connected to ground at 84 with its other end connected to the bimetal element 74 so that the winding 82 is directly energizable by the secondary of the transformer-buzzer device 41 through the circuit including ground line 84, winding 82, bimetal element leg 83, contacts 76 and 78, line 80 and jack 50. Since the winding 82 is energized through the contacts 76 and 78, the contacts are caused to intermittently make and break cyclically in accordance with a period determined by the spring tension between the contacts. The circuit for energizing the indicator arm heater winding 62 also includes the contacts 76 and 78 so that the current flowing therethrough is cyclic in nature. The regulator operates to produce a relatively constant mean effective voltage as follows. If the line voltage at the primary 12 of the transformer-buzzer device 41 increases, the period of the cycle operation of the regulator also increases, thus reducing the mean effective voltage applied to the winding 62. Conversely, when the line voltage decreases, the period of cyclic operation of the regulator also decreases which causes an increase in the mean effective voltage applied to heater winding 62. The U-shape of the bimetal element 74 again provides ambient temperature compensation for the voltage regulator 75.

The desired temperature level at which the alarm buzzer is to operate is preselectable by means of the temperature selector arm 56. The arm 56 carries a contact 86 on an extension 88 which is radially opposite the indicating portion of the arm 56. The contact 86 is engageable with a contact 90 supported by and for rotation with the indicator arm 54 and which is connected to ground by lead 92. The contact 86 is directly connected by lead 94 to the jack 50 so that when the indicator arm 54 rotates to a position in alignment with the temperature selecting arm 56, the engagement of the contacts 86 and 90 closes a direct shorting circuit across the secondary of the transformer-buzzer device 41. The short circuit increases current flow through the secondary 14 to produce leakage flux which energizes the vibratable flexible reed 42 to produce an audible warning signal. Since the jack 50 is at ground potential when the contacts are closed, the energizing voltages to the heater windings 62 and 82 no longer exist and the contacts 86 and 90 will disengage as the bimetal element 50 cools and tends to straighten. Current will again flow through the windings after the disengagement of the shorting contacts 86 and 90 until their engagement is again affected. Thus, the vibrating reed 42 is intermittently energized to produce an intermittent audible signal.

As previously mentioned the jack 52 and attendant circuitry shown in phantom represent the prior art requirements. A separate alarm device such as a bell 100 was required with leads 102 and 104 making connection therefrom to jacks 50 and 52, respectively. Also the lead 94, terminating at one end with contact 86, had its other end terminating at jack 52 rather than at jack 50. Thus the engagement of contacts 86 and 90, when the indicator arm 54 reached the selected temperature level represented by the position of selector arm 56, served to complete a circuit for the alarm 100 through the circuit extending from the secondary 14 of the transformer which included jack 50, lead 102, alarm 100, lead 104, jack 52, lead 94, contacts 86, 90 and lead 92 to ground.

It will be noted that the prior art device required an extra jack 52, two extra leads 102 and 104 as well as the bell or buzzer alarm. These components have been eliminated in the present device by the teaching of this invention. This represents a great savings in material and manufacturing costs which is advantageous in a highly competitive market of the type in which this device sold.

Although there has been described only one embodiment of the invention described in detail and illustrated in the drawings, it will be appreciated that many modifications may be made thereto without departing from the spirit and scope of the invention.

What is claimed is:

1. A device for warning of the attainment of a predetermined temperature level, comprising a transformer having a flux permeable core with a primary and a secondary winding surrounding separate portions, an A.C. voltage source connected to the primary of said transformer, a temperature responsive variable resistance, a heater element, means series connecting said resistance and said heater element across said transformer secondary winding, means including bimetal operated contacts responsive to a predetermined heat generated by said element for intermittently short-circuiting said resistance and said heater element, and magnetically operative means responsive to the increased curent flow in said secondary winding caused by the short circuit for intermittently indicating the predetermined temperature level.

2. The device of claim 1 wherein said magnetically operable indicating means comprises an armature having one end fixedly supported by said core adjacent one side of said secondary winding and its other end vibratably connectable with said core adjacent the other end of said secondary winding.

3. The device of claim 1 wherein said magnetically operable indicating means comprises a flexible, magnetic-flux-permeable reed having one end fixedly connected to said core adjacent one side of said secondary winding and its other end vibratably connectable with said core adjacent the other end of said secondary winding.

4. An indicating device comprising a voltage source, a heater element, a sensor element for controlling the current through said heater element, means electrically connecting said elements to said voltage source, means responsive to the heat generated by said heater element for intermittently short circuiting said elements, and means responsive to the increased current flow through said voltage source due to said short-circuiting for intermittently indicating said condition.

5. An indicating device comprising a voltage source, a heater element, means including a temperature sensing element for controlling the power delivered to said heater element, means electrically connecting said elements to said voltage source, means including bimetal operated contacts for intermittently short-circuiting said elements responsive to a predetermined delivered power, and means responsive to the increased current flow through said voltage source due to said short-circuiting for intermittently indicating said predetermined delivered power.

6. An indicating device comprising a voltage source, a heater element, a sensor unit for controlling the current through said heater element and connected with said heating element to said voltage supply, means including bimetal-operated contacts controllable by said heater element for intermittently short-circuiting said voltage source and means operative responsive to the shorting of said voltage supply for intermittently indicating said shorted condition.

7. An indicating device comprising a voltage source, an indicator, a variable resistor sensor unit, a heating element series connected with said indicator and said sensor unit across said voltage supply, intermittently operated, normally-open bimetal contacts controllable by said heating element parallel connected across said sensor unit and said heater element, said indicator operable responsive only to the current therethrough when said contacts are closed.

8. An indicating device comprising a voltage source including a transformer, a heater element, a sensor unit for controlling the current through said heater element and connected with said heater element to the secondary of said transformer, means including bimetal-operated contacts controllable by said heater element for intermittently short-circuiting said transformer secondary and a buzzer operative responsive to the shorting of said transformer secondary for intermittently indicating said shorted conditions.

9. A device for warning of the attainment of a predetermined temperature level, comprising a transformer having a primary and a secondary winding, an A.C. voltage source connected to the primary of said transformer, a temperature responsive variable resistance, a heater element, means series connecting said resistance and said heater element across said transformer secondary winding, means including bimetal operated contacts responsive to a predetermined heat generated by said element for intermittently short-circuiting said resistance and said heater element, and means responsive to the increased current flow in said secondary winding caused by the short-circuiting for intermittently indicating the predetermined temperature level.

References Cited by the Examiner

UNITED STATES PATENTS

| 1,622,862 | 3/27 | Detmers | 340—401 |
| 2,028,263 | 1/36 | Warrick | 340—401 |
| 2,519,368 | 8/50 | Hallerberg | 340—213 |
| 2,617,867 | 11/52 | Welch | 340—384 X |
| 2,762,997 | 9/56 | Boddy | 340—213 |
| 2,912,650 | 11/59 | Dawkins et al. | 324—106 |
| 3,010,097 | 11/61 | Boddy | 340—213 |
| 3,099,825 | 7/63 | Harriman | 340—213 |

NEIL C. READ, *Primary Examiner.*